H. G. BLANCHARD & F. DUESLER.
METHOD OF MAKING VULCANIZED RUBBER ARTICLES.
APPLICATION FILED OCT. 14, 1914.

1,190,261. Patented July 11, 1916.

WITNESS:
S. L. Taylor

INVENTORS:
Harry G. Blanchard,
and Frank Duesler.
BY
Ernest Hopkinson
THEIR ATTORNEY

UNITED STATES PATENT OFFICE.

HARRY G. BLANCHARD, OF NEW YORK, N. Y., AND FRANK DUESLER, OF CLEVELAND, OHIO, ASSIGNORS TO THE MECHANICAL RUBBER COMPANY, A CORPORATION OF NEW JERSEY.

METHOD OF MAKING VULCANIZED-RUBBER ARTICLES.

1,190,261.   Specification of Letters Patent.   Patented July 11, 1916.

Application filed October 14, 1914. Serial No. 866,708.

*To all whom it may concern:*

Be it known that we, HARRY G. BLANCHARD, a citizen of the United States, residing in the city of New York, county and State of New York, and FRANK DUESLER, a citizen of the United States, residing in the city of Cleveland, county of Cuyahoga, and State of Ohio, have invented certain new and useful Improvements in the Method of Making Vulcanized-Rubber Articles, of which the following is a full, clear, and exact disclosure.

Our invention relates to that class of articles which are composed of a wall or body of vulcanized rubber compositions with or without an outer cover or jacket of another material such as braided or woven fabric.

Our invention applies particularly to hollow articles such as tubing which is intended for use where comparatively high pressures are employed in conducting a liquid or gas from one point to another, such as supplying air from a pump or tank to a pneumatic automobile tire.

The object of our invention is to produce an article which will be strong enough to withstand the pressures desired and which will also be durable and at the same time flexible and elastic.

Heretofore, particularly in the manufacture of tubing of the class described, difficulty has been encountered in obtaining good exterior vulcanization and the necessary adhesion between the rubber of the inner tube and the fabric envelop or jacket and in obtaining an even tension on the thread composing such jacket.

Briefly stated, our invention comprises the forming or molding an article of unvulcanized rubber stock and then vulcanizing the same by submitting one side, such as the interior to the action of heat carried by one kind of a conductive medium, and the other side, such as the outside, to a different heat conductive or conveying medium. In the case of tubing made from unvulcanized rubber stock, it comprises braiding or otherwise forming an outer cover or jacket on the formed tubing stock, supplying the interior of the tubing with a fluid heat conductive medium under the requisite pressure and in surrounding the tubing during vulcanization by a dry heat conveying medium.

The accompanying drawings illustrate one form of apparatus which may be used in carrying out the vulcanization of the hose made in accordance with these drawings.

Figure 1:
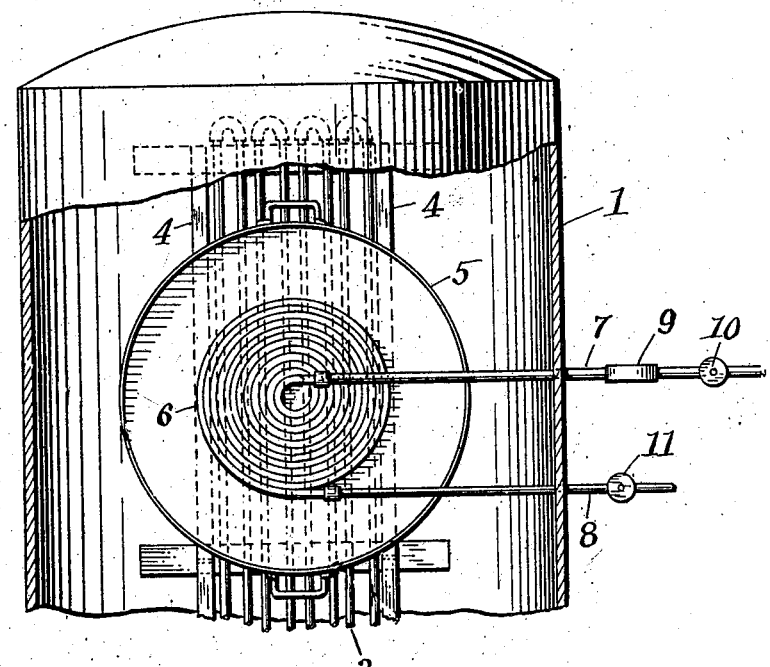
Figure 2:
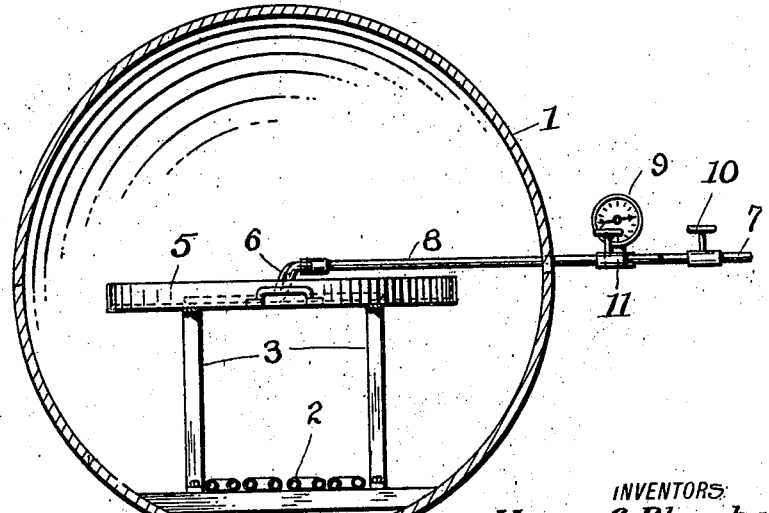

Figure 1 is a plan view showing the outer shell of the vulcanizer broken away to disclose the interior, and Fig. 2 is a vertical section thereof.

In the drawings the numeral 1 indicates a shell, in any suitable part of which is placed a series of steam pipes, indicated at 2. Supported on suitable standards 3, or in any other suitable manner, is a series of bars 4 upon which rests a pan 5 in which the hose 6 to be vulcanized is coiled. Projecting through the sides of the shell 1, so that their ends are located slightly above the pan 5, are two pipes 7 and 8, the ends of which are adapted to be connected with the hose 6 and through which a suitable vulcanizing medium is supplied. These pipes may be provided with the usual pressure gage 9 and cocks or valves 10 and 11.

In detail, the tubing is first formed by hand or by the use of a tube-drawing machine as is well known in the art. This tubing is preferably formed in lengths of about five hundred feet. The tubing is then sealed or closed at one end and a slight air atmospheric pressure applied to the other end which is sufficient to slightly distend the tubing so as to prevent collapsing during later handling. The article is then covered with the required coating or covering and in the case of tubing, it is placed in a suitable braiding or weaving machine and the outer cover or jacket is braided or woven about the outer surface thereof. The tubing thus prepared is then coiled in the pans and placed in the heater or vulcanizer, each end of the tubing being connected by the pipes 7 and 8 passing through the sides of the vulcanizer with a supply of fluid medium under pressure and a suitable cock, respectively. A dry vulcanizing agent, such as dry air, is then supplied in the space about the tubing within the vulcanizer, the same being heated by the pipes 2 or in any other suitable way to the requisite temperature to produce the required vulcanization. The said cock permits the operator to ascertain whether the medium, such as live steam or water has completely filled the tubing and also to maintain an even pressure throughout the length of the tubing. The tubing is cured or vulcanized in the vulcanizer the time required for a particular rubber stock and at the necessary internal and external temperature produced by the vulcanizing mediums above referred to.

Heretofore in the manufacture of rubber tubing, such as jacketed hose, the usual practice has been to form the interior of the hose out of rubber stock and then partially vulcanize the same. The jacket is then applied by being braided or woven about the partially vulcanized tube and caused to adhere thereto by the application of rubber cement or some other adhesive. The hose or tube was then completely vulcanized by having steam admitted to the interior thereof while the outside of the hose was simply exposed to the open air without any vulcanizing medium surrounding the same. This method of manufacture produced in many instances a poor adhesion between the fabric and the rubber, and also prevented the strains being evened up before the vulcanization took place. For the use of our improved method these disadvantages are eliminated because the exterior and the interior of the tubing are both submitted to the same vulcanizing effect, and the rubber stock being unvulcanized is allowed to soften and under the pressure of the interior is allowed to flow into the interstices between the threads or strands of the jacket. A further advantage arises from our improved process by reason of the fact that the vulcanizing medium produces the same external and internal temperature; whereas, in the previous method the vulcanization was greater on the interior and less on the exterior surface of the inner tube where it contacts with the fabric jacket. Thus it will be seen that our improved method results in the production of a hose or tubing which is superior in several particulars over those previously produced by other methods.

We do not wish our invention to be understood as being limited to the manufacture of articles herein mentioned nor to the details or steps mentioned, for the same may be utilized by those skilled in the art in the manufacture of a great variety of objects or articles where it is advantageous to submit one portion or side thereof to one kind of vulcanization and another side or portion to another kind.

Having thus described our invention, what we claim and desire to protect by Letters Patent is:

1. The method of making rubber articles which comprises forming the article of unvulcanized rubber stock, treating one portion or surface thereof with a vaporable fluid medium and treating another portion or surface thereof with another fluid heat conveying medium of different character.

2. The method of making rubber articles which comprises forming the article of unvulcanized rubber stock, treating one portion or surface thereof with a vaporous heat carrying medium and another portion or surface thereof with a gaseous heat carrying medium.

3. The method of making rubber articles which comprises forming the article of unvulcanized rubber stock, treating one portion or surface thereof with steam and another portion or surface thereof with dry heated air.

4. The method of making hollow rubber articles which comprises forming the article of unvulcanized rubber stock, treating the interior thereof with a vaporable fluid heat conveying medium, and treating the exterior thereof with another fluid heat conveying medium of different character.

5. The method of making hollow rubber articles which comprises forming the article of unvulcanized rubber stock, treating the interior thereof with a vaporable heat conveying medium, and the exterior thereof with a dry fluid heat conveying medium.

6. The method of making hollow rubber articles which comprises forming the article of unvulcanized rubber stock, inflating the interior thereof with a heated fluid under pressure and treating the exterior thereof with a dry heated gas.

7. The method of making hollow rubber articles which comprises forming the walls thereof of unvulcanized rubber stock, inflating the same to prevent collapsing, forming a covering on the exterior thereof, introducing therein a heated fluid under pressure and submitting the exterior to a fluid heat conveying medium of a different character which will not injure said covering.

8. The method of making hollow rubber articles which comprises forming the wall thereof of unvulcanized rubber stock, inflating the same to prevent collapsing, forming a covering on the exterior thereof, introducing therein a vaporable heat conveying medium, and submitting the exterior to a dry fluid heat conveying medium.

9. The method of making hollow rubber articles which comprises forming the walls thereof of unvulcanized rubber stock, inflating the same to prevent collapsing, forming a covering on the exterior thereof, introducing steam therein, and submitting the exterior to dry heated air.

10. The method of making fabric covered hollow rubber articles which comprises forming the inner walls of unvulcanized rubber stock, inflating the same to prevent collapsing, covering the same with fabric, introducing therein a heat conveying medium under pressure and at a vulcanizing temperature, and submitting the exterior thereof to fluid heat conveying medium at a vulcanizing temperature.

11. The method of making fabric covered hollow articles which comprises forming the inner walls of unvulcanized rubber stock, inflating the same to prevent collapsing, covering the same with endless fabric, introducing therein a heat conveying medium under pressure and at a vulcanizing temperature and submitting the exterior thereof to a dry fluid heat conveying medium at a vulcanizing temperature.

12. The method of making fabric covered hollow articles which comprises forming the inner walls of unvulcanized rubber stock, inflating the same to prevent collapsing, covering the same with a non-expansible fabric, introducing therein live steam under pressure and at a vulcanizing temperature, and submitting the exterior thereof to a dry fluid heat conveying medium at a vulcanizing temperature.

13. The method of making fabric covered hollow articles which comprises forming the inner walls of unvulcanized rubber stock, inflating the same to prevent collapsing, covering the same with a non-expansible fabric, introducing therein live steam under pressure and at a vulcanizing temperature and submitting the exterior thereof to a dry gas at a vulcanizing temperature.

14. The method of making jacketed rubber tubing which comprises forming a tube of unvulcanized rubber stock, covering the same with fabric, introducing therein a heat conveying medium under pressure and at a vulcanizing temperature, and submitting the exterior to a fluid heat conveying medium at a vulcanizing temperature.

15. The method of making jacketed rubber tubing which comprises forming a tube of unvulcanized rubber stock, covering the same with fabric, introducing therein live steam under pressure, and submitting the exterior to a dry gas at a vulcanizing temperature.

16. The method of making jacketed rubber tubing which comprises forming a tube of unvulcanized rubber stock, inflating the same to prevent collapsing, covering the same with fabric, introducing therein live steam under pressure, and submitting the exterior to a dry gas at a vulcanizing temperature.

17. The method of making jacketed rubber tubing which comprises forming a tube of unvulcanized rubber stock, inflating the same to prevent collapsing, braiding a fabric thereon, introducing therein a heat conveying medium under pressure and at a vulcanizing temperature, and submitting the exterior to a dry fluid heat conveying medium at a vulcanizing temperature.

18. The method of making jacketed rubber tubing which comprises forming a tube of unvulcanized rubber stock, inflating the same to prevent collapsing, braiding a fabric thereon, introducing therein live steam under pressure, and submitting the exterior to a dry air at a vulcanizing temperature.

Signed at New York, county of New York, State of New York, this 13th day of October, 1914.

HARRY G. BLANCHARD.

Witnesses:
 FRANCIS BOYLE,
 EDW. W. VAILL.

Signed at Cleveland county of Cuyahoga State of Ohio this ninth day of October 1914.

FRANK DUESLER.

Witnesses:
 A. W. SPICER,
 A. C. FOOTE.